Patented Sept. 8, 1925.

1,552,874

UNITED STATES PATENT OFFICE

IWAN OSTROMISLENSKY AND MORRIS G. SHEPARD, OF NEW YORK, N. Y., ASSIGNORS TO THE NAUGATUCK CHEMICAL COMPANY, OF NAUGATUCK, CONNECTICUT, A CORPORATION OF CONNECTICUT.

PROCESS FOR MAKING HOMOLOGUES OF STYROL FROM AROMATIC HYDROCARBONS.

No Drawing. Original application filed May 7, 1924, Serial No. 711,583. Divided and this application filed January 30, 1925. Serial No. 5,891.

*To all whom it may concern:*

Be it known that we, IWAN OSTROMISLENSKY and MORRIS G. SHEPARD, a citizen of Russia and a citizen of the United States, respectively, both residents of New York, county and State of New York, have invented certain new and useful Improvements in Processes for Making Homologues of Styrol from Aromatic Hydrocarbons, of which the following is a full, clear, and exact description.

This invention relates to the production of styrol homologues from hydrocarbons having eight or more carbon atoms such as homologues and analogues of ethyl benzol, xylol and the like.

This invention is a division of our copending application Serial No. 711,583, filed May 7, 1924.

The object of the present invention is to provide a process for preparing the homologues of styrol, such as the alkylated, or more specifically methylated and/or ethylated styrols and similar compounds.

Another object of the invention is to provide a simple, economical method of carrying out pyrogenic decomposition of the raw materials to produce these homologues of styrol.

The invention accordingly comprises a process for making homologues of styrol by heating a hydrocarbon having at least eight carbon atoms and at least ten hydrogen atoms at a temperature of approximately 450° C. to approximately 700° C., thus partially decomposing the hydrocarbon to form a compound having the general formula $ArCH:CH_2$ where Ar represents aryl. More specifically the invention consists in producing a compound of the general formula $ArCH:CH_2$ where Ar represents aryl containing an alkyl group.

This application is a continuation in part of our application Serial No. 648,751, filed June 30, 1923.

For carrying out the invention, the apparatus described in our copending application Serial No. 711,583, filed May 7, 1924, may be employed.

Briefly this apparatus consists of a source of carbon dioxide or other neutral gas from which the gas is led by a pipe through a flow-meter whence it is introduced into the interior of an iron pipe which is heated to the required temperature by gas burners or other suitable means. Communicating with the iron tube through a suitable valve and sight glass is a container for the hydrocarbon which constitutes the raw material in the process. The temperature is determined for example by means of a thermocouple, the temperature determination being made on the gas in the interior of the tube at about the middle. A condenser and receiver are provided and a gas holder is connected therewith to collect uncondensable gases.

Generally speaking the processes for producing styrol, its homologues and analogues may be divided into two groups which are designated as follows: (1) dehydrogenation of ethyl benzene or its homologues at high temperature (450°–700° C.) and (2) splitting off hydrocarbons from various homologues or analogues of benzene which have more than two carbon atoms in a side chain (500–700° C.)

The general formulæ for these reactions may be represented as (1) $ArC_2H_4R = H_2 + ArCH:CH_2$ where Ar represents aryl and R represents an element such as hydrogen.

(2) $ArC_2H_4M = MH + ArCH:CH_2$ where Ar is aryl and M represents an alkyl radical.

In the second general formula MH signifies the hydrocarbon which is split off.

If a compound of the general formula $ArC_2H_4R$, where R=hydrogen is employed the product is styrol provided the Ar is not alkylated. When, however, an alkyl group or groups are introduced into the Ar, then homologues of styrol result. The general formula is then $R'ArC_2H_4R$, where R' represents a substitution in the aryl, being alkyl, aryl, or an element. It is with the latter formula that this invention is concerned.

Depending upon the nature of the alkylation in Ar the following products may be obtained from the proper raw materials:

(a) ortho methyl styrol from ortho methyl ethyl benzol or ortho ethyl toluol.

(b) para methyl styrol from para methyl ethyl benzol or para ethyl toluol.

(c) symmetrical dimethyl styrol from 1.3.5 dimethyl ethyl benzol or ethylated xylol.

(d) ethyl styrol from diethyl benzol.

The following is a tabulation of results obtained by the dehydrogenation of the isomer xylol and homologues of ethyl benzol into those of styrol according to a process similar to that set forth in our copending application Serial No. 711,583, filed May 7, 1924, for dehydrogenation of ethyl benzol to form styrol therefrom. The following table gives the conditions of operation of the apparatus described in application Serial No. 711,583, filed May 7, 1924, items C, D, E, and F giving the explicit conditions of operation.

| | | | | | |
|---|---|---|---|---|---|
| A. Boiling temperature of original mixture (° C.). | 140° | 175-185° | 145-160° | 160-165° | 180°. |
| B. Nature of active hydrocarbon | Xylol | 1.3 5 dimethyl ethyl benzol | Orthomethyl ethyl benzol. | Paramethyl ethyl benzol. | Diethyl-benzol |
| C. Amount in grams per minute | 15 gms | 0.62 gm | 0.51 gm | 0.52 gm | 18 gms. |
| D. Duration of process | 1 hr. 7 min | 6 h. 45 m | 3 h. 15 m | 7 hrs | 45 mins. |
| E. Mixture subjected to pyrogenization in gms. | 1000 gms | 250 gms | 109 gms | 217 gms | 849 gms. |
| F. Temperature of furnace (° C.) | 650° | 640-650° | 580-620° | 640-650° | 650°. |
| G. Liquid products obtained | 944 gms | 225 gms | 97 gms | 199 gms | 800 gms. |
| H. Dry hydrocarbons distilled with steam | 833 gms | 178 gms | 85 gms | 170 gms | 684 gms. |
| I. Nature of product obtained | Styrol | Metametadimethyl styrol. | Orthomethyl styrol. | Paramethyl styrol. | Ethyl styrol. |
| J. Content of styrol homologues in distillate (steam) by analysis. | 5.7% | 31.7% | 28.6% | 35.7% | 23.8%. |

Whether the process is carried out in iron or quartz tubes the results are substantially as given above. Actually the above results were gotten using an iron tube for xylol and a quartz tube for the other substances. The quartz tube had the following dimensions: 1" diameter by 27" long. It has been found that the relationship of the volume in the heating chamber, the rate of flow and temperature exists in a similar way for products other than ethyl benzol which may be expressed mathematically by the formula given in connection with the process employing ethyl benzol.

Instead of using the homologues of ethyl benzol, etc. separately, it may sometimes be desirable to pass mixtures of ethyl benzol and/or of its homologues through the heated tube to obtain a solution which contains styrol and its homologues or the homologues alone depending upon which was used as the starting material. For this purpose mixtures of ethyl benzol and its homologues may be conveniently obtained by ethylating mixtures comprising benzol, toluol and xylol as for example the fractions obtained from coal tar, gas tar, etc., and boiling from 80° C. to 130° C.

As many apparently widely different embodiments of this invention may be made without departing from the spirit thereof, it will be understood that we do not intend to limit ourselves to the specific embodiment herein set forth except as indicated in the appended claims.

Having thus described our invention, what we claim and desire to protect by Letters Patent is:

1. A process for making compounds of the type $R'ArCH:CH_2$, where Ar represents aryl and R' represents a substitution in Ar, which comprises heating a hydrocarbon having the general formula $R'ArC_2H_4R$ where R represents an element, to a temperature of approximately 450° C.-700° C. and partially decomposing the $-C_2H_4R$ thereof to yield $-CH:CH_2$.

2. A process for making compounds of the type $R'ArCH:CH_2$ where Ar represents aryl, and R' represents a substitution in Ar which comprises heating a hydrocarbon having the general formula $R'ArC_2H_4R$ where R represents hydrogen, to a temperature of approximately 450° C. to approximately 700° C., and splitting hydrogen from the side chain thereof to yield compounds of the formula $ArCH:CH_2$.

3. A process for making homologues of styrol which comprises heating alkylated alkyl benzols of the type having two or more carbon atoms in at least one of the alkyl substitutions and splitting hydrogen from the alkyl group containing at least two carbon atoms to form an alkylated styrol.

4. The process for making alkyl styrols from isomers of alkylated ethyl benzols which comprises splitting hydrogen from a side chain of said ethyl benzols which contains at least two carbon atoms.

5. The process for making methyl styrols from isomeric methyl ethyl benzols which comprises passing the vaporized methyl ethyl benzol through a conduit heated to a temperature of approximately 450° C. to approximately 700° C., splitting hydrogen from the ethyl radical thereof to form isomeric methyl styrols.

Signed at Cromwell, Connecticut, this 26th day of January, 1925.

IWAN OSTROMISLENSKY.

Signed at New York, New York, this 28th day of January, 1925.

MORRIS G. SHEPARD.